(12) United States Patent
Masubuchi et al.

(10) Patent No.: US 7,528,197 B2
(45) Date of Patent: May 5, 2009

(54) COMPOSITION DERIVED FROM A SOFTENING AGENT AND A THERMOPLASTIC RESIN COMPOSITION CONTAINING THE SAME

(75) Inventors: Naganori Masubuchi, Tokyo (JP); Michihisa Tasaka, Kawasaki (JP)

(73) Assignee: Riken Technos Corporation, Tokyo (JP)

( * ) Notice: Subject to any disclaimer, the term of this patent is extended or adjusted under 35 U.S.C. 154(b) by 0 days.

(21) Appl. No.: 11/984,525

(22) Filed: Nov. 19, 2007

(65) Prior Publication Data
US 2008/0085976 A1    Apr. 10, 2008

Related U.S. Application Data

(63) Continuation of application No. 09/792,776, filed on Feb. 23, 2001, now abandoned.

(30) Foreign Application Priority Data

Feb. 23, 2000    (JP) .............................. 2000-046199

(51) Int. Cl.
    C08L 53/02    (2006.01)
    C08K 5/01    (2006.01)
    C08J 3/24    (2006.01)
(52) U.S. Cl. .......................... 525/185; 525/71; 525/98; 524/487; 524/490
(58) Field of Classification Search ........................ None
See application file for complete search history.

(56) References Cited

U.S. PATENT DOCUMENTS

| 5,187,224 A | * | 2/1993 | Hamanaka et al. | .......... 524/505 |
| 5,929,165 A | * | 7/1999 | Tasaka et al. | .............. 525/92 F |
| 2003/0055166 A1 | | 3/2003 | Mizuno | |

FOREIGN PATENT DOCUMENTS

| EP | 0 376 213 A1 | 7/1990 |
| EP | 0 770 645 A | 2/1997 |
| EP | 0 810 262 A | 3/1997 |
| EP | 0 845 498 A | 3/1998 |
| EP | 0 994 153 A1 | 4/2000 |
| FR | 2 262102 | 9/1975 |
| JP | 61 223042 | 10/1986 |
| JP | 11-124441 | 11/1999 |
| WO | WO 01 57103 | 9/2001 |

* cited by examiner

*Primary Examiner*—David Buttner
(74) *Attorney, Agent, or Firm*—Oliff & Berridge, PLC

(57) ABSTRACT

This invention provides a softening agent composition obtained by blending and heat treating (a) 100 parts by weight of at least one non-aromatic hydrocarbon softening agent for rubber; (b) 0.1 to 10 parts by weight of an organic peroxide; and (c) 0.1 to 50 parts by weight of a crosslinking aid, with the proviso that the weight ratio of component (b) to component (c) is 1 or less. The softening agent composition is useful and very easy to handle in the production of a thermoplastic resin composition.

10 Claims, No Drawings

COMPOSITION DERIVED FROM A SOFTENING AGENT AND A THERMOPLASTIC RESIN COMPOSITION CONTAINING THE SAME

This is a Continuation of application Ser No. 09/792,776 filed Feb. 23, 2001 now abandoned, which claimed priority to Japanese Patent Application No. 2000-46199, filed Feb. 23, 2000. The disclosure of the prior application is hereby incorporated by reference herein in its entirety.

BACKGROUND

This invention relates to a composition derived from a softening agent for rubber and a thermoplastic resin composition containing the same.

Conventionally, a thermoplastic elastomeric resin composition having a desired hardness has been produced by adding oils as a plasticizer and olefinic resins as a resin component to a styrenic resin composition or an ethylene-propylene resin composition (see, for example, Japanese Patent Application Laid-Open Nos. S54-99156, S58-145751, S61-28548, H05-287132 and H08-66990). As the oils, paraffin oil has been often used. However, although the addition of the oils makes the hardness lower, it causes deterioration in heat resistance, weathering resistance, mechanical strength, and abrasion resistance because the molecular weights of the oils used are lower than those of the resin components.

If use is made of conventional oils which are not crosslinked to obtain a very soft thermoplastic resin composition, the oils will bleed out onto the surface of a molded article and thus a satisfactory molded thermoplastic resin composition is not attained.

Further, the amount of oils which can be absorbed in a thermoplastic resin composition is limited. A largest ratio of the amount of oils to be absorbed to the amount of a thermoplastic resin composition is just over 3. If the oil is added more than the upper limit, bleed-out of the oil occurs.

The oils are liquid, while the other components are solid. Accordingly, the oils are troublesome to handle and require a special equipment for blending such as a pump.

SUMMARY

It has now been found that the oils become solid or jelly-like by themselves by crosslinking them and therefore they become very easy to handle.

Also, the material obtained by crosslinking the oil (hereinafter referred to as "the present softening agent composition") is blended with a small amount of a thermoplastic elastomeric resin or a thermoplastic resin to obtain a very soft elastomer with no bleed-out. This elastomer has been found to have excellent impact absorption property, and accordingly, is applicable as a damper, a muffler or the like. Furthermore, it has been found that when the present softening agent composition is used in the production of a thermoplastic elastomeric resin composition having a usual hardness, the resulting resin composition shows decreased bleed-out in the evaluation of heat resistance and also has improved mechanical strength and abrasion resistance.

Thus, this invention is a composition derived from a softening agent for rubber, characterized in that the composition is obtainable by blending and heat treating (a) 100 parts by weight of at least one non-aromatic hydrocarbon softening agent for rubber;

(b) 0.1 to 10 parts by weight of an organic peroxide; and (c) 0.1 to 50 parts by weight of a crosslinking aid, with the proviso that the weight ratio of component (b) to component (c) is 1 or less.

Further, the invention provides a thermoplastic resin composition, characterized in that the composition is obtainable by blending and heat treating (a) 100 parts by weight of at least one non-aromatic hydrocarbon softening agent for rubber;

(b) 0.1 to 10 parts by weight of an organic peroxide;

(c) 0.1 to 50 parts by weight of a crosslinking aid; and (d) 1500 parts by weight or less of a thermoplastic resin, with the proviso that the weight ratio of component (b) to component (c) is 1 or less.

Also, the invention provides a thermoplastic resin composition comprising 100 parts by weight of the present softening agent composition thus obtained and (d) 0.1 to 1500 parts by weight of a thermoplastic resin.

DETAILED DESCRIPTION OF EMBODIMENTS

Each of the components used in the present softening agent composition will be explained.

Component (a): Non-aromatic Hydrocarbon Softening Agent for Rubber

Examples of the non-aromatic hydrocarbon softening agents for rubber used in the invention include non-aromatic mineral oils and non-aromatic liquid or low molecular weight synthetic softening agents. Mineral oil softening agents for rubber are usually mixtures of aromatic cyclic ones, naphthenic cyclic ones and paraffinic ones. Those in which 50% or more of the whole carbon atoms is in saturated hydrocarbon or paraffinic chains are called a saturated hydrocarbon or paraffinic type; those in which 30 to 40% of the whole carbon atoms is in naphthenic rings are called a naphthenic type; and those in which 30% or more of the whole carbon atoms is in aromatic rings are called an aromatic type. Mineral oil softening agents for rubber to be used in the invention are preferably of the aforesaid saturated hydrocarbon, i.e. paraffinic type, or naphthenic type. Aromatic softening agents are less preferred because of their poor dispersion.

The paraffinic ones are particularly preferred as the non-aromatic hydrocarbon softening agents for rubber. Among the paraffinic ones, those with a less content of aromatic cyclic components are particularly preferred.

Examples of the paraffins include n-paraffins such as methane, ethane, propane, butane, pentane, hexane, heptane, octane, nonane, decane, undecane, dodecane, tetradecane, pentadecane, hexadecane, heptadecane, octadecane, nonadecane, icosane, henicosane, docosane, tricosane, tetracosane, pentacosane, hexacosane, heptacosane, octacosane, nonacosane, triacontane, hentriacontane, dotriacontane, pentatriacontane, hexacontane and heptacontane; isoparaffins such as isobutane, 2-methylbutane (isopentane), neopentane, 2-methylpentane (isohexane), 3-methylbutane (isopentane), 2,2-dimethylbutane (neohexane), 2,3-dimethylbutane, 2-methylhexane, 3-methylhexane, 3-ethylpentane, 2,2-dimethylpentane, 2,3-dimethylpentane, 2,4-dimetylpentane, 3,3-dimethylpentane, 2,2,3-trimethylbutane (tributane), 3-methylheptane, 2,2-dimethylhexane, 2,3-dimethylhexane, 2,4-dimethylhexane, 2,5-dimethylhexane, 3,4-dimethylhexane, 2,2,3-trimethylpentane, 2,2,4-trimethylpentane (isooctane), 2,3,4-trimethylpentane, 2,3,3-trimethylpentane, 2,3,4-trimethylpentane, 2-methyloctane (isononane), 2-methylnonane, isodecane, isoundecane, isododecane, isotridecane, isotetradecane, isopentadecane, isooctadecane, isononanodecane, isoicosane and 4-ethyl-5-methyloctane; and derivatives thereof.

These paraffins have 4 to 155, preferably 4 to 50 carbon atoms.

Specific examples of the non-aromatic hydrocarbon softening agents for rubber include PW-90 (n-paraffinic process oil, ex Idemitsu Kosan Co.) and IP-Solvent 2835 (synthetic isoparaffinic hydrocarbon having 99.8% by weight or more isoparaffin, ex Idemitsu Sekiyu Kagaku Co.).

Besides the above, this component may further comprise a small amount of unsaturated hydrocarbons and derivatives thereof. Examples of the unsaturated hydrocarbons include ethylenic hydrocarbons such as ethylene, propylene, 1-butene (α-butylene), 2-butene (β-butylene), isobutylene (γ-butylene), 1-pentene (α-amylene), 2-pentene (β-amylene), 3-methyl-1-butene(γ-amylene), 3-methyl-1-butene (α-isoamylene), 2-methyl-2-butene (β-isoamylene), 1-hexene, 2,3-dimethyl-2-butene (tetramethylethylene), 1-heptene, 1-octane, 1-nonene and 1-decene); and acetylenic hydrocarbons such as acetylene, methylacetylene, 1-butyne, 2-butyne, 1-pentyne, 1-hexyne, 1-octyne, 1-nonyne and 1-decyne.

Component (b): Organic Peroxide

Examples of the organic peroxides used in the invention include dicumyl peroxide, di-tert.-butyl peroxide, 2,5-dimethyl-2,5-di(tert.-buty-lperoxy)hexane, 2,5-dimethyl-2,5-di(tert.-butylperoxy)hexine-3,1,3-bis(tert.-butylperoxyisopropyl)benzene, 1,1-bis(tert.-butylperoxy)-3,3,5-trimetylcyclohexane, n-butyl-4,4-bis(tert.-butylperoxy)valerate, benzoyl peroxide, p-chlorobenzoyl peroxide, 2,4-dichlorobenzoyl peroxide, tert.-butylperoxy benzoate, tert.-butylperoxyisopropyl carbonate, diacetyl peroxide, lauroyl peroxide, and tert.-butylcumyl peroxide.

Among these, most preferred are 2,5-dimethyl-2,5-di(tert.-butylper-oxy)hexane and 2,5-dimethyl-2,5-di(tert.-butylperoxy)hexine-3 in terms of smell, coloring and scorch stability.

The amount of the organic peroxide added is at most 10.0 parts by weight, preferably at most 5.0 parts by weight, and at least 0.1 parts by weight, per 100 parts by weight of component (a), with the proviso that the weight ratio of component (b) to component (c) described below is 1 or less. If it is more than the upper limit, the degradation reaction with the organic peroxide prevails, and therefore the resultant composition is not so desirably solid as easy to handle.

Component (c): Crosslinking Aid

Component (c) used in the present invention is effective to carry out uniform and efficient crosslinking in the crosslinking with component (b) above. Particularly, if component (c) is used in a large amount, bleed-out of substances having a low molecular weight may be greatly inhibited. Examples of the crosslinking aid include polyfunctional methacrylate compounds such as ethyleneglycol dimethacrylate, diethyleneglycol dimethacrylate, triethyleneglycol dimethacrylate, tetraethyleneglycol dimethacrylate, polyethyleneglycol dimethacrylate having 9 to 14 ethyleneglycol repeating units, trimethylolpropane trimethacrylate, allyl methacrylate, 2-methyl-1,8-octanediol dimethacrylate and 1,9-nonanediol dimethacrylate; polyfunctional acrylate compounds such as polyethyleneglycol diacrylate, 1,6-hexanediol diacrylate, neopentylglycol diacrylate and propyleneglycol diacrylate; and polyfunctional vinyl compounds such as vinylbutyrate, vinylstearate, divinylbenzene and triallylcyanurate. These may be used alone or in a combination of two or more. These compounds are expected to give uniform and efficient crosslinking.

Among these, polyfunctional methacrylate compounds and polyfunctional acrylate compounds are preferred, and triethyleneglycol dimethacrylate, tetraethyleneglycol dimethacrylate, 2-methyl-1,8-octanediol dimethacrylate and 1,9-nonanediol dimethacrylate are particularly preferred.

The amount of the crosslinking aid added is at most 50.0 parts by weight, preferably at most 45.0 parts by weight, and at least 0.1 parts by weight, per 100 parts by weight of component (a). If the amount is less than the lower limit, the effect of this material is not sufficiently attained. If it exceeds the upper limit, the crosslinking proceeds in the composition so much that the crosslinking aid can not be wholly dispersed, and therefore the appearance of a molded article therefrom is worse and further, the compression set and the oil resistance are also bad.

The present invention relates also to a thermoplastic resin composition obtainable by blending component (d) below with the softening agent composition obtained by blending and heat treating the above components (a) to (c).

Component (d): Thermoplastic Resin

Examples of the thermoplastic resin used in the invention include styrenic resins such as polystyrene (PS), high impact polystyrene (HIPS), styrene-butadiene-styrene copolymer (SBS), styrene-isoprene-styrene copolymer (SIS), styrene-ethylene.butene-styrene copolymer (SEBS), styrene-ethylene.propylene-styrene copolymer (SEPS) and styrene-ethylene.ethylene.propylene-styrene copolymer (SEEPS); styrene-butadiene rubber (SBR), butadiene rubber (BR), polybutadiene (syndiotactic 1,2-polybutadiene), isoprene rubber (IR), acrylonitril-butadiene rubber (NBR), chloroprene rubber (CR), ethylene-propylene rubber (EPM), ethylene-propylene terpolymer (EPDM), butyl rubber (IIR), acryl rubber (ACM), polyolefinic resins such as polyethylene (PE) and polypropylene (PP), thermoplastic polyester elastomer, thermoplastic polyurethane elastomer, and thermoplastic amide elastomer.

The aforesaid thermoplastic resins may be used alone or in a combination of two or more.

Component (d) consists preferably of one or more selected from components (d1) and (d2) which will be described below.

Component (d1): (Hydrogenated) Block Copolymer

Component (d1) is a block copolymer consisting of at least one polymeric block A composed mainly of a vinyl aromatic compound and at least one polymeric block B composed mainly of a conjugated diene compound, or a hydrogenated block copolymer obtained by hydrogenating this block copolymer, or a mixture thereof, such as vinyl aromatic compound-conjugated diene compound block copolymers having structure, A-B, A-B-A, B-A-B-A or A-B-A-B-A and/or those obtained by hydrogenating such.

The (hydrogenated) block copolymer, meaning a block copolymer and/or a hydrogenated block copolymer, contains 5 to 60% by weight, preferably 20 to 50% by weight, of a vinyl aromatic compound.

Preferably, the polymeric block A composed mainly of a vinyl aromatic compound consists wholly of a vinyl aromatic compound or is a copolymeric block comprising 50% by weight or more, preferably 70% by weight or more, of a vinyl aromatic compound and a (hydrogenated) conjugated diene compound, wherein the (hydrogenated) conjugated diene compound refers to a conjugated diene compound and/or a hydrogenated conjugated diene compound.

Preferably, the polymeric block B composed mainly of a (hydrogenated) conjugated diene compound consists solely of a (hydrogenated) conjugated diene compound or is a copolymeric block comprising 50% by weight or more, preferably 70% by weight or more, of a (hydrogenated) conjugated diene compound and a vinyl aromatic compound.

The vinyl aromatic compound or the (hydrogenated) conjugated diene compound may be distributed at random, in a tapered manner (i.e. a monomer content increases or decreases along a molecular chain), in a form of partial block or in any combination thereof in the polymeric block A composed mainly of a vinyl aromatic compound and in the polymeric block B composed mainly of a (hydrogenated) conjugated diene compound, respectively.

Where two or more of the polymeric block A composed mainly of a vinyl aromatic compound or two or more of the polymeric block B composed mainly of a (hydrogenated) conjugated diene compound are present, they may be the same with or different from each other in structure.

The vinyl aromatic compound to compose the (hydrogenated) block copolymer may be one or more selected from, for instance, styrene, alpha-methyl styrene, vinyl toluene, and p-tert.-butyl styrene, preferably styrene. The conjugated diene compound may be one or more selected from, for instance, butadiene, isoprene, 1,3-pentadiene, and 2,3-dimethyl-1.3-butadiene, preferably butadiene, isoprene and combination thereof.

The polymeric block B composed mainly of the conjugated diene compound may have any micro bond structure.

It is preferred that the butadiene block has 20 to 50%, more preferably 25 to 45%, of 1,2-micro bond structure.

In the isoprene block, it is preferred that 70 to 100% by weight of isoprene is in 1,4-micro bond structure and at least 90% of the aliphatic double bonds derived from isoprene is hydrogenated.

A weight average molecular weight of the (hydrogenated) block copolymer with the aforesaid structure to be used in the invention is preferably 5,000 to 1,500,000, more preferably 10,000 to 550,000, further more preferably 100,000 to 400,000. A molecular weight dispersion (i.e. a ratio of the weight average molecular weight (Mw) to the number average molecular weight (Mn), Mw/Mn) is preferably 10 or less, more preferably 5 or less, particularly 2 or less. Molecule structure of the (hydrogenated) block copolymer may be linear, branched, radial or any combination thereof.

Many methods have been proposed for the preparation of such block copolymers. As described, for instance, in JP Publication 40-23798/1965, block polymerization may be carried out using a lithium catalyst or a Ziegler catalyst in an inert solvent. The block copolymer thus obtained may be hydrogenated in the presence of a hydrogenation catalyst in an inert solvent to obtain the hydrogenated block copolymer.

Examples of the (hydrogenated) block copolymer include styrene-butadiene-styrene copolymer (SBS), styrene-isoprene-styrene copolymer (SIS), styrene-ethylene.butene-styrene copolymer (SEBS), styrene-ethylene.propylene-styrene copolymer (SEPS) and styrene-ethylene.ethylene.propylene-styrene copolymer (SEEPS).

Component (d2): Olefinic Resin and/or Olefinic Copolymer Rubber

Examples of the olefinic resin and copolymer rubber used in the invention include a peroxide-decomposing olefinic resin and a peroxide-decomposing olefinic copolymer rubber, and a peroxide-crosslinking olefinic resin and a peroxide-crosslinking olefinic copolymer rubber.

The peroxide-decomposing olefinic resin and the peroxide-decomposing olefinic copolymer rubber attain an effect of improving dispersion of the rubber in the composition obtained so as to improve appearance of a molded article. Further, it is effective in controlling hardness and shrinkage of a molded article. The component is an olefinic polymer or copolymer which decomposes in heat treatment in the presence of peroxide to decrease its molecular weight and therefore to increase its melt flowability. Examples of such include isotactic polypropylenes, and copolymers of propylene with another alpha-olefine such as ethylene, 1-butene, 1-hexene or 4-methyl-1-pentene.

The peroxide-crosslinking olefinic resin and the peroxide-crosslinking olefinic copolymer rubber are mainly crosslinked by heat treatment in the presence of peroxide to decrease its flowability. Examples of such include polyethylene having a polymer density of 0.88 to 0.94 $g/cm^3$ such as high density polyethylene, low density polyethylene, linear low density polyethylene and ultra-low density polyethylene, and amorphous random copolymer elastomers such as ethylene-propylene copolymer rubber and ethylene-propylene-nonconjugated diene copolymer rubber. Among these, polyethylene and ethylene-propylene copolymer rubber are preferred. Linear low density polyethylene is particularly preferred because it gives proper crosslinked structure.

A weight average molecular weight of the olefinic resin and the olefinic copolymer rubber is preferably 50,000 to 1,000,000, more preferably 70,000 to 500,000. If a peroxide-crosslinking olefinic resin or a peroxide-crosslinking olefinic copolymer rubber having a weight average molecular weight of less than 50,000 is used, the resulting elastomer composition is inferior in rubber properties. If the weight average molecular weight exceeds 1,000,000, the moldability of the resin composition is worse, which deteriorates, in particular, the appearance of a molded article. MFR, determined at 230° C. and a load of 2.16 kg, of the olefinic resin and the olefinic copolymer rubber is preferably 0.05 to 200 g/10 min, more preferably 0.1 to 50 g/10 min.

The amount of component (d) is at most 1500 parts by weight and at least 0.1 part by weight, preferably at least 1.0 part by weight, per 100 parts by weight of the present softening agent composition. Preferably, the thermoplastic resin may be blended in an amount of 50 parts by weight or less per 100 parts by weight of the present softening agent composition to obtain a very soft thermoplastic resin composition (elastomer). On the other hand, 100 to 300 parts by weight of a thermoplastic resin per 100 parts by weight of the present softening agent composition may preferably be blended to obtain a soft thermoplastic resin composition having hardness A according to JIS K7215 with no bleed-out of the component (a). If the amount of a thermoplastic resin exceeds 300 parts by weight, a thermoplastic resin composition having hardness D according to JIS K7215 may be obtained. If a harder thermoplastic resin composition is desired, 400 parts by weight or more of a thermoplastic resin may preferably be blended. If a still harder thermoplastic resin composition is desired, 600 parts by weight or more of a thermoplastic resin may preferably be blended. If the amount exceeds the upper limit, the hardness of a molded article from the resin composition is so high that the article loses flexibility and, accordingly, loses rubber-like touch. In addition, the moldability is worse.

Further, the present invention relates to a thermoplastic resin composition obtainable by blending and heat treating component (d) together with the above components (a) to (c). The amount of component (d) is 1500 parts by weight or less per 100 parts by weight of component (a) and preferably at least 0.1 parts by weight per 100 parts by weight of component (a). Preferably, the thermoplastic resin may be blended in an amount of 50 parts by weight or less per 100 parts by weight of component (a) to obtain a very soft thermoplastic resin composition (elastomer). On the other hand, 100 to 300 parts by weight of a thermoplastic resin per 100 parts by weight of component (a) may preferably be blended to obtain a soft thermoplastic resin composition having hardness A according to JIS K7215 with no bleed-out of the component (a). If the amount of a thermoplastic resin exceeds 300 parts by weight, a thermoplastic resin composition having hardness D according to JIS K7215 may be obtained. If a harder thermoplastic resin composition is desired, 400 parts by weight or more of a thermoplastic resin may preferably be blended. If a still harder thermoplastic resin composition is desired, 600 parts by weight or more of a thermoplastic resin may preferably be blended. If the amount exceeds the upper limit, the hardness of a molded article from the resin composition is so high that the article loses flexibility and, accordingly, loses rubber-like touch. In addition, the moldability is worse. Examples of the thermoplastic resins used preferably include styrene-ethylene.butene-styrene copolymer (SEBS), styrene-ethylene.propylene-styrene copolymer (SEPS) and styrene-ethylene.ethylene-propylene-styrene copolymer (SEEPS).

In the softening agent composition and thermoplastic resin composition of the invention, it is possible to blend various additives such as anti-blocking agents, heat stabilizers, antioxidants, light stabilizers, UV absorbers, lubricants, colorants, thickening agents, anti-aging agents and fillers in addition to the aforesaid components.

Preparation Process

Now, the process for the preparation of the present softening agent composition and the thermoplastic resin composition will be explained.

Process for the Preparation of the Present Softening Agent Composition

The present softening agent composition may be obtained in the following process.

The conditions for the preparation may vary depending on reaction equipment used.

For example, the present softening agent composition may be obtained by blending the aforesaid components (a) to (c), putting the blend into a reactor which can be heated, such as an autoclave, and allowing it to react at a reaction temperature of 100 to 250° C., preferably 120 to 200° C., for 10 minutes or more.

If the reaction temperature is below 100° C., the organic peroxide does not decompose, and no crosslinking reaction occurs. If it exceeds 250° C., the organic peroxide decomposes very rapidly and, therefore, the crosslinking reaction dose not proceed uniformly.

The composition thus obtained is jelly-like, and preferably has an extraction residue of 10% by weight or more after it is immersed in acetone at room temperature for 48 hours.

Because the present softening agent composition is jelly-like, it can be handled like a solid in the preparation of a thermoplastic resin composition. Further, it can be applied by itself as an impact-absorber, a damper, a muffler or the like because it is jelly-like.

Process for the Preparation of the Thermoplastic Resin Composition Containing the Present Softening Agent Composition The thermoplastic resin composition containing the present softening agent composition may be obtained by blending the present softening agent composition with component (d), followed by kneading the blend with a kneading means.

The present softening agent composition and component (d) are first blended with each other and then melt kneaded with a kneading means at a kneading temperature of 160 to 230° C. to obtain the desired thermoplastic resin composition. Alternatively, an extrusion molding machine or injection molding machine which is equipped with a function for kneading may be used to produce a molded article.

The kneading means used in the invention include pressure kneaders, Banbury mixers, single-screw extruders, twin-screw extruders and multi-screw extruders. Preferably, batch-wise kneading means such as pressure kneaders and Banbury mixers are used. In order to carry out the aforesaid process continuously, a batch-wise kneading means in combination with an extruder, for example, a pressure kneader in combination with an extruder, i.e., batchwise-feeding continuous extruder, may be used for the kneading.

In this process, when component (d) is blended in a relatively small amount with the present softening agent composition, the hardness of the resin composition can be easily controlled and therefore a very soft thermoplastic resin composition (elastomer), compared with conventional thermoplastic resin compositions, can be obtained (see Examples 5 to 10).

In addition, components (b) organic peroxide and (c) crosslinking aid which may be those used in the present softening agent composition may be again blended in the thermoplastic resin composition and then melt kneaded to obtain a thermoplastic resin composition with improved heat resistance and oil resistance (see Example 13).

In this case, the amounts of component (b) organic peroxide and component (c) crosslinking aid added are each at least 0.1 part by weight, and at most 10 parts by weight, preferably at most 8.0 parts by weight, per 100 parts by weight of the present softening agent composition. If the amounts exceed the upper limit, the organic peroxide disperses ununiformly to cause partial crosslinking. As a result, even though molded articles can be obtained, their appearance is not good, and their compression set and oil resistance are bad. If the amounts are less than the lower limit, the effects of these materials are not sufficiently exhibited, and compression set and heat resistance are not improved.

Alternatively, the present thermoplastic resin composition can be prepared by blending and heat treating component (d) together with components (a) to (c). If a relatively small amount of a thermoplastic resin, e.g. 50 parts by weight or less of a thermoplastic resin per 100 parts by weight of component (a), is blended, components (a) to (d) may be heat treated in the same manner as in the preparation of the present softening agent composition above to obtain a thermoplastic resin composition (elastomer) which is very soft, compared with conventional thermoplastic resin compositions (see Example 4). If a relatively large amount of a thermoplastic resin, e.g. 100 to 1500 parts by weight of a thermoplastic resin per 100 parts by weight of component (a), is blended, components (a) to (d) may be melt kneaded in the same manner as in the above preparation of the thermoplastic resin composition containing the present softening agent composition to obtain a thermoplastic resin composition having hardness A to D according to JIS K7215 with no bleed-out of component (a) (see Examples 14 to 18).

Various additives such as anti-blocking agents, light stabilizers, heat stabilizers, antioxidants, UV absorbers, lubricants, colorants, thickening agents, anti-aging agents and fillers may be added in the production of the present softening agent composition or the thermoplastic resin composition, but they are preferably added in the production of the thermoplastic resin composition so that they disperse uniformly.

EXAMPLES

The present invention will be further elucidated with reference to the following Examples and Comparative Examples, which are not intended to limit the invention.

Examples 1 to 4 and Comparative Examples 1 to 3

Components in the amounts indicated in Table 1 are blended in an autoclave at 140° C. to cause crosslinking to obtain the present softening agent composition.

TABLE 1

|  | Example 1 | Example 2 | Example 3 | Example 4 | Comparative Example 1 | Comparative Example 2 | Comparative Example 3 |
|---|---|---|---|---|---|---|---|
| Component (a-1) | 100 | — | 50 | 50 | 100 | 100 | 100 |
| Component (a-2) | — | 100 | 50 | 50 | — | — | — |
| Component (b) | 3 | 3 | 3 | 3 | 3 | 0 | 10 |
| Component (c) | 3 | 3 | 3 | 3 | 0 | 3 | 3 |
| Thermoplastic resin *1 | — | — | — | 5 | — | — | — |
| State of the Composition *2 | jelly | jelly | jelly | jelly | liquid | liquid | liquid |
| Extraction residue *3 | 35 | 25 | 30 | 34 | 0 | 0 | 5 |

(a-1) non-aromatic softening agent for rubber: PW-90 (ex Idemitsu Kosan Co.) type: n-paraffinic process oil
(a-2) branched saturated hydrocarbon: IP-Solvent 2835 (ex Idemitsu Petrochemical Co.) type: synthetic iso-paaffinic hydrocarbon
(b) organic peroxide: Perhexa 25B (ex Nippon Oil & Fat Co.) type: 2,5-dimethyl-2,5-dl(t-butylperoxy)hexane
(c) crosslinking aid: NK ester IND (ex Shin-Nakamura Chemical Co.) type: mixture of 85% of 2-methyl-1,8-octanediol dimethacrylate and 15% of 1,9-nonanediol dimethacrylate
*1 Thermoplastic resin: SEPS (Septon 4077, ex Kuraray Inc.) type: styrene-ethylene•propylene-styrene copolymer
*2 State of the composition: state of the softening agent composition at room temperature (23° C.); "jelly" refers to a jelly-like one which can be handled like a solid
*3 Extraction residue: extraction residue in % by weight after the obtained composition was immersed in a solvent, acetone, at room temperature for 48 hours Examples 5 to 10 and Comparative Examples 4 to 6

As component (d), one or more selected from SEPS, EPR, Engage, PE, SEBS and SIS were blended in the amounts indicated in Table 2 with the present softening agent composition prepared in Example 3. Then, the blend was kneaded with a pressure kneader (kneader temperature: 160 to 230° C.) to produce a very soft thermoplastic resin composition, compared with conventional thermoplastic resin compositions. In Comparative Examples 4 to 6, a conventional uncrosslinked oil, PW-90, was used instead of the present softening agent composition prepared in Example 3.

As shown in Table 2, when a small amount of a thermoplastic resin is added to the present softening agent composition, a solid elastomeric substance can be obtained. In the Comparative Examples where a conventional uncrosslinked oil was used, the products remain liquid.

Examples 11 to 13 and Comparative Examples 7 and 8

In Examples 11 and 12, one or more selected from SEPS, EPR, Engage, PP and PS were used as component (d). After they were blended with the present softening agent composi-

TABLE 2

|  | Example 5 | Example 6 | Example 7 | Example 8 | Example 9 | Example 10 | Comparative Example 4 | Comparative Example 5 | Comparative Example 6 |
|---|---|---|---|---|---|---|---|---|---|
| The present softening agent Composition | 100 | 100 | 100 | 100 | 100 | 100 | — | — | — |
| PW-90 | — | — | — | — | — | — | 100 | 100 | 100 |
| SEPS | 20 | 10 | — | — | — | — | 20 | 10 | — |
| EPR | — | — | 20 | — | — | — | — | — | 20 |
| Engage | — | 10 | — | — | — | — | — | 10 | — |
| PE | — | — | — | 20 | — | — | — | — | — |
| SEBS | — | — | — | — | 20 | — | — | — | — |
| SIS | — | — | — | — | — | 20 | — | — | — |
| State of the product (r.l.) | solid | solid | solid | solid | solid | solid | liquid | liquid | liquid |

EPR: EP961SP ex JSR Co. type: ethylene-propylene rubber
Engage: Engage 8150 ex Dow Chemical Japan Inc. type: ethylene-octene copolymer
PE: NUCDFDA1137 ex Nippon Uniker type: linear low density polyethylene
SEBS: Krayton G G1654X ex Shell Japan Co. type: SEBS
SIS: SIS5002 ex JSR Co. type: SIS tion prepared in Example 3 in the amounts indicated in Table 3, the blend was kneaded with a twin-screw extruder (cylinder temperature: 200° C.) to produce a thermoplastic resin composition. In Example 13, the thermoplastic resin composition prepared in Example 12 was subjected to heat treatment in the presence of an organic peroxide. In Comparative Examples 7 and 8, a conventional uncrosslinked oil, PW-90, was used instead of the present softening agent composition prepared in Example 3.

Examples 19 and 20

Components (a) to (d) were blended in the amounts indicated in Table 5 and kneaded with a pressure kneader (kneader temperature: 160 to 230° C.) to produce a thermoplastic resin composition. When a larger amount of component (c) was blended, bleed-out could be better prevented.

TABLE 3

|  | Example 11 | Example 12 | Example 13 | Comparative Example 7 | Comparative Example 8 |
|---|---|---|---|---|---|
| The present softening agent composition | 100 | 100 | 100 | — | — |
| PW-90 | — | — | — | 100 | 100 |
| IP-2835 | — | — | — | — | — |
| SEPS | 80 | 45 | 80 | 80 | 45 |
| EPR | — | — | — | — | — |
| Engage | — | 45 | — | — | 45 |
| PP | 20 | — | 20 | 20 | — |
| PS | — | 10 | — | — | 10 |
| Perhexa25B | — | — | 3 | — | — |
| NK Ester IND | — | — | 3 | — | — |
| Bleed-out | ○ | ○ | ○ | Δ | X |
| Tensile strength | 13 MPa | 11 MPa | 12 MPa | 10 MPa | 9 MPa |

PP: PN610S ex Tokuyama Co. type: block type polyprolylene
PS: GP 1-301 ex Denki Kagaku Kogyo Co. type: HIPS
Bleed-out: A sheet of a thickness of 1 mm was prepared on a press and allowed to stand at 50° C. to determine a time when bleed-out was observed. ○: a week or more; Δ: three days or more; X: less than three days
Tensile strength: determined in accordance with JIS K6251 using a No. 3 dumbbell (tensile speed: 500 mm/min.)

As shown in Table 3, when the present softening agent composition is used in the production of a thermoplastic resin composition having hardness A according to JIS K7215, the resulting thermoplastic resin composition shows less bleed-out and has improved mechanical strength.

Examples 14 to 18

Components (a) to (d) were blended in the amounts indicated in Table 4 and kneaded with a pressure kneader (kneader temperature: 160 to 230° C.) to produce a thermoplastic resin composition. As a result, a thermoplastic resin composition having hardness indicated in Table 4 (measured according to JIS K7215) could be obtained with no bleed-out.

TABLE 5

|  |  | Example 19 | Example 20 |
|---|---|---|---|
| Component (a) | PW-90 | 100 | 100 |
| Component (b) | 25B | 1 | 1 |
| Component (c) | IND | 20 | 40 |
| Component (d) | Total amount | 130 | 130 |
| Component (d-1) | SEPS | 80 | 80 |
| Component (d-2) | PP (PN610S) | 50 | 50 |
| Bleed-out |  | ○ | ○ |
| Tensile strength | MPa | 10 | 9 |

TABLE 4

|  |  | Example 14 | Example 15 | Example 16 | Example 17 | Example 18 |
|---|---|---|---|---|---|---|
| Hardness (JIS K7215) |  | Hardness 40A | Hardness 85A | Hardness 40D | Hardness 50D | Hardness 60D |
| Component (a-1) | PW-90 | 50 | 100 | 100 | 100 | 100 |
| Component (a-2) | IP-2835 | 50 |  |  |  |  |
| Component (b) | 25B | 3 | 1 | 1 | 1 | 1 |
| Component (c) | IND | 3 | 2 | 2 | 2 | 2 |
| Component (d) | Total amount | 100 | 180 | 320 | 490 | 1230 |
| Component (d-1) | SEPS | 80 | 80 | 80 | 80 | 80 |
| Component (d-2) | PP (PN610S) | 20 | 100 | 240 | 410 | 1150 |
| Bleed-out |  | ○ | ○ | ○ | ○ | ○ |
| Tensile strength | MPa | 9 | 15 | 17 | 19 | 21 |

What is claimed is:

1. A method of preparing an thermoplastic resin composition comprising:
   obtaining a crosslinked softening agent composition by blending and heat treating the components comprising:
   (a) 100 parts by weight of at least one non-aromatic hydrocarbon softening agent for rubber;
   (b) 0.1 to 10 parts by weight of an organic peroxide; and
   (c) 0.1 to 50 parts by weight of a crosslinking aid, wherein the weight ratio of component (b) to component (c) is 1 or less and components (a)-(c) are blended and heat treated in the absence of any thermoplastic resins; and
   blending the crosslinked softening agent composition with 1 to 1500 parts by weight of a thermoplastic resin relative to 100 parts by weight of the crosslinked softening agent composition.

2. A method according to claim 1, wherein component (a) is a saturated hydrocarbon having 4 to 155 carbon atoms.

3. A method according to claim 1, wherein component (a) is a saturated hydrocarbon having 4 to 50 carbon atoms.

4. A method according to claim 1, wherein component (a) is a linear saturated hydrocarbon.

5. A method according to claim 1, wherein component (a) is a branched saturated hydrocarbon.

6. A method according to claim 1, wherein component (a) is liquid at room temperature.

7. A method according to claim 1, wherein the crosslinked softening agent composition has an extraction residue of 10% by weight or more after immersion in acetone.

8. A thermoplastic resin composition obtained according to the method of claim 1
   wherein the crosslinked softening agent composition is blended and heat treated in the absence of any thermoplastic resins and subsequently blended with the thermoplastic resin.

9. A thermoplastic resin composition according to claim 8, wherein the thermoplastic resin is selected from the group consisting of
   (i) a block copolymer consisting of at least one polymeric block A composed mainly of a vinyl aromatic compound and at least one polymeric block B composed mainly of a conjugated diene compound,
   (ii) a hydrogenated block copolymer obtained by hydrogenating the block copolymer in (i),
   (iii) an olefinic resin and,
   (iv) an olefinic copolymer rubber.

10. A thermoplastic resin composition obtained by heat treating a thermoplastic resin composition according to claim 8 in the presence of an organic peroxide.

* * * * *